United States Patent Office 3,027,372
Patented Mar. 27, 1962

3,027,372
STANNOUS CHLORIDE BIS-(2-PYRIDYL-1-OXIDE) DISULFIDE AND METHOD OF PREPARING SAME
Bernard A. Starrs, New Haven, Conn., assignor to Olin Mathieson Chemical Corporation, a corporation of Virginia
No Drawing. Filed May 4, 1959, Ser. No. 810,530
2 Claims. (Cl. 260—270)

This invention relates to novel chemical compounds useful as fungicides.

*Example*

A solution comprising 0.04 mole of stannous chloride dihydrate, 40 milliliters of concentrated hydrochloric acid and 200 milliliters of water was added to a stirred solution comprising 0.04 mole of bis-(2-pyridyl-1-oxide) disulfide,

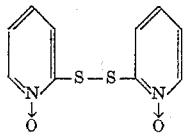

and 50 milliliters of concentrated hydrochloric acid in 1.0 liter of water. After stirring for 20 minutes the pH of the mixture was 0.42 and precipitation of the product was essentially complete. The white product was filtered off, washed 8 times with 10 milliliters of water each and 2 times with 10 milliliters of isopropanol each and finally dried in a vacuum at 55° C. The yield of the stannous chloride complex, $SnCl_2 \cdot (C_5H_4NOS)_2$, was 97.6 percent by weight based on the disulfide. The product is a white solid melting with decomposiiton at 313° C. The tin analysis expressed as stannous chloride was:

|  | Percent |
|---|---|
| Calculated | 42.91 |
| Found | 42.87 |

The product was tested as a foliage fungicide by the method described in Phytopathology, 37 354–356 (1947) and known as the "Test Tube Dilution Technique for Use with the Slide Germination Method of Evaluating Protectant Fungicides." In this test using *Monilinia fructicola* it was found that 25 parts per million of the above compound was sufficient to completely inhibit the fungus.

The reaction can be carried out using bis-(2-pyridyl-1-oxide) disulfide which has been substituted in positions on the pyridine rings other than the 1 and 2 positions with any innocuous groups such as lower alkyl or halo groups. In carrying out the reaction it is only necessary to bring the bis-(2-pyridyl-1-oxide) disulfide or a derivative thereof as described above together with stannous chloride in an acidified aqueous solution.

The compound of this invention can control various fungi when applied to the substrate. It can be used on leather, paper, skin, varnish, rope, textiles and other substrates on which fungi can thrive. When applied to an uninfected substrate it can prevent infection thereof by many types of fungi. This stannous chloride complex can be dispersed on an inert finely divided solid and employed as a dust. Suitable solid carriers are clay, talc, bentonite, as well as other carriers known in the art (see Frear, "Chemistry of Insecticides, Fungicides and Herbicides"). Alternately, the compound may be applied as a spray in a liquid carrier or as a suspension in a nonsolvent such as water. When applied as a suspension it may be desirable to incorporate wetting agents. This compound may also be admixed with carriers that are themselves active, such as other parasiticides, herbicides and fertilizers.

The new compound possesses the advantage of water insolubility over the biologically active bis-(2-pyridyl-1-oxide) disulfide derivative from which it is made. It is thus less subject to leaching from the foliage.

I claim:
1. Stannous chloride bis-(2-pyridyl-1-oxide) disulfide having the empirical formula $SnCl_2 \cdot (C_5H_4NOS)_2$.
2. The process of preparing stannous chloride bis-(2-pyridyl-1-oxide) disulfide having the empirical formula

$$SnCl_2 \cdot (C_5H_4NOS)_2$$

which comprises reacting stannous chloride with bis-(2-pyridyl-1-oxide) disulfide in an acidic, aqueous mixture and recovering the precipitated product.

References Cited in the file of this patent
UNITED STATES PATENTS

| 2,544,904 | Steiger | Mar. 13, 1951 |
| 2,742,476 | Bernstein et al. | Apr. 17, 1956 |
| 2,809,971 | Bernstein et al. | Oct. 15, 1957 |
| 2,863,802 | Pyne | Dec. 9, 1958 |
| 2,909,459 | Hovey | Oct. 20, 1959 |

FOREIGN PATENTS

| 761,171 | Great Britain | Nov. 14, 1956 |